United States Patent                                    [15] 3,655,411
Albright                                                   [45] Apr. 11, 1972

[54] APPARATUS FOR PRESSURIZED COOKING OF FOODS IN HIGH-TEMPERATURE NON-AQUEOUS LIQUIDS

[72] Inventor: Charles Jere Albright, 313 West N. Ave., Chicago, Ill. 60610

[22] Filed: Aug. 5, 1968

[21] Appl. No.: 750,353

[52] U.S. Cl. .................................. 99/330, 99/336, 99/407, 99/408
[51] Int. Cl. ........................................................ A47j 27/08
[58] Field of Search ............... 99/330, 403, 326, 327, 332, 99/333, 342, 343, 356, 408, 444, 107; 220/57, 553

[56] References Cited

UNITED STATES PATENTS 3,194,662  7/1965  Nelson ............................ 99/107 X
3,210,193  10/1965  Martin ............................... 99/1
3,245,800  4/1966  Sanders ............................ 99/107
3,280,722  10/1966  Rahauser ....................... 99/408 X
3,364,845  1/1968  Wilson ............................. 99/408 X
2,532,639  12/1950  Payne ............................... 126/380

Primary Examiner—Robert W. Jenkins
Attorney—Shoemaker & Mattare

[57] ABSTRACT

The essential concept of this invention involves an improved structuring of an apparatus for the pressurized cooking of foods in high-temperature, non-aqueous liquids for a time-controlled period and effect a nearly instant separation of the cooked foods from the pressure and the hot liquid at the termination of each cooking period so as to retain in the cooked food the juices inherent in the food.

29 Claims, 13 Drawing Figures

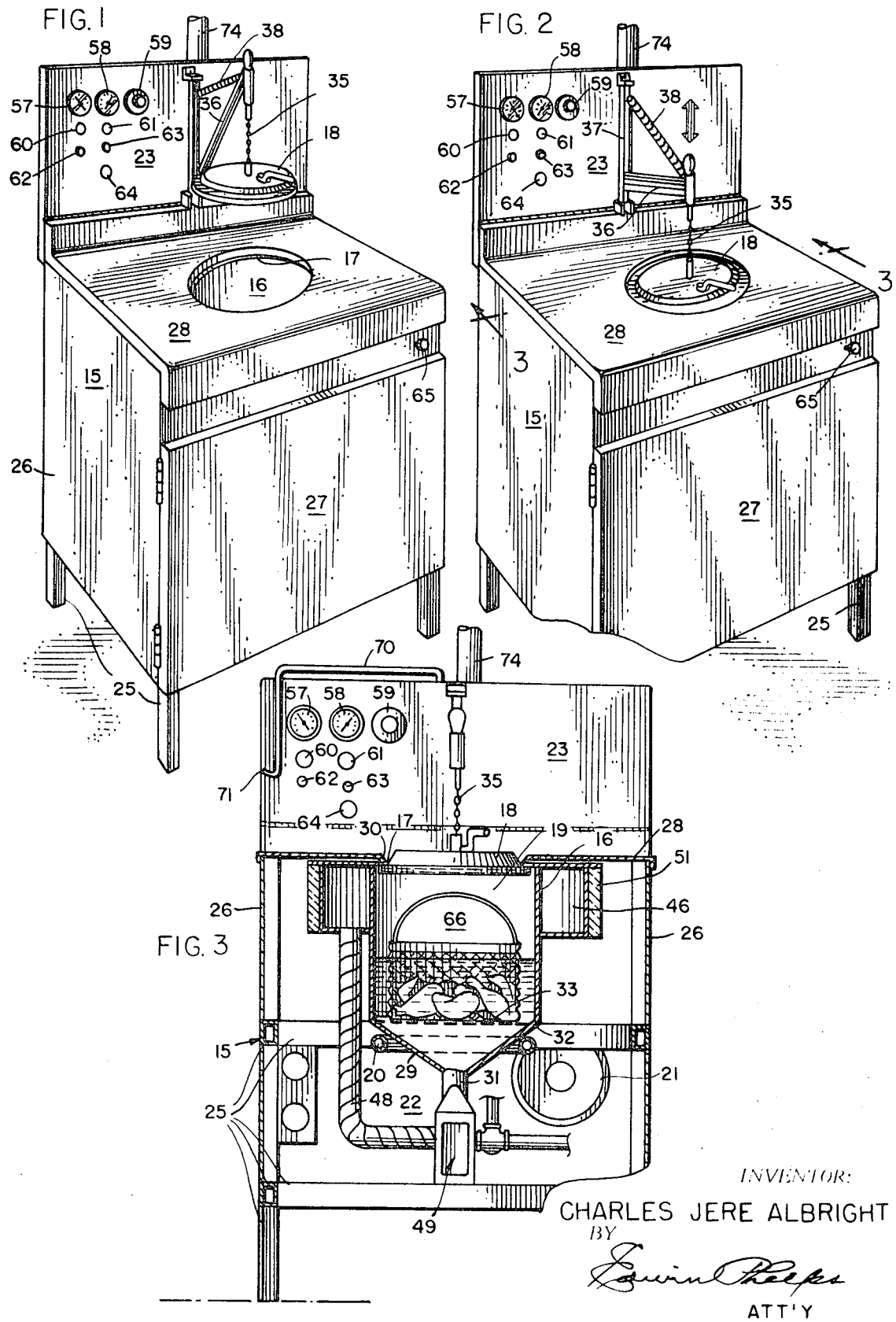

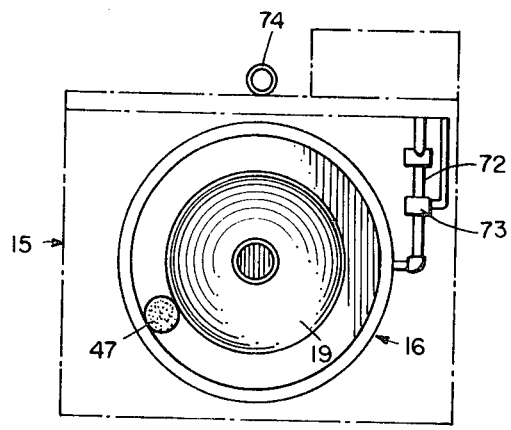
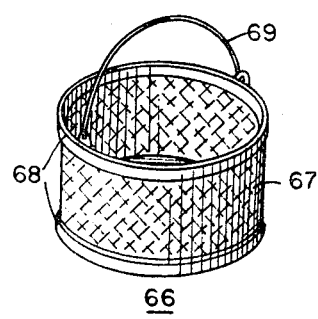
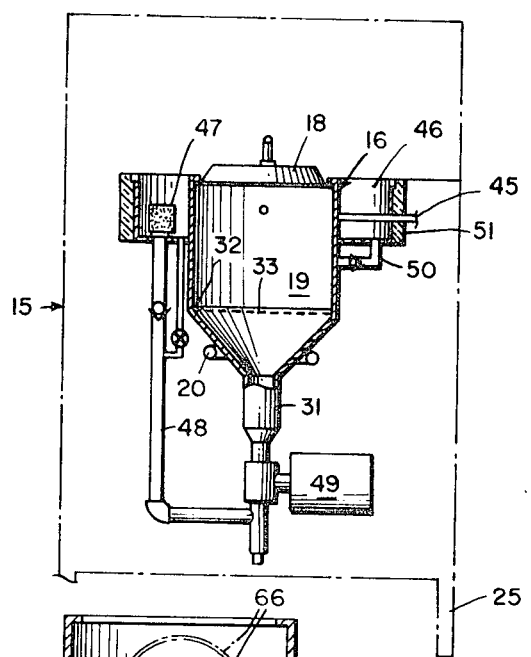
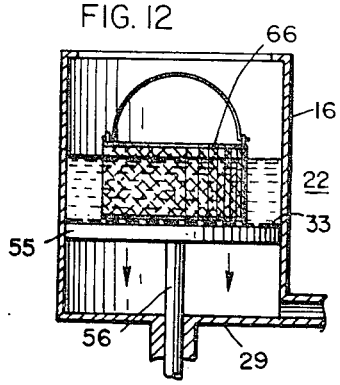
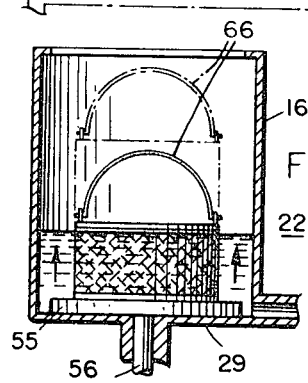
INVENTOR:
CHARLES JERE ALBRIGHT

FIG. 7

| | OPERATIONS | CYCLE-MINUTES 0 1 2 3 4 5 6 7 8 9 10 11 12 |
|---|---|---|
| MAKE READY | TURN ON POWER SWITCH | |
| | POUR IN COOKING LIQUID | |
| | CLOSE SW. 65 TO HEATER 20 FOR HEATING THE LIQUID | |
| COOK | INSERT FOOD | |
| | CLOSE LID; CLOSE SW. 60 & 61 TEMP. & PRESSURE INDICATORS OPER. | |
| | SET TIMER 59 TO EFFECT COOKING OPERATION | (QUANTITY OF FOOD) |
| | TIMER OFF; VALVE 52 OPENS LIQUID PRESSURED TO CONTAINER | |
| REMOVE FOOD | WITHDRAW CLOSURE LID; REMOVE FOOD | |
| | LIQUID RETURNS FROM CONTAINER TO RECEPTACLE | |
| CLEANSING | ACTUATE SW. 64 TO HOLD LIQUID IN CONTAINER | |
| | CLEANSE RECEPTACLE | |
| RESUME COOK | REACTIVATE SW. 64 RESUME OPERATIONS | (QUANTITY OF FOOD) |

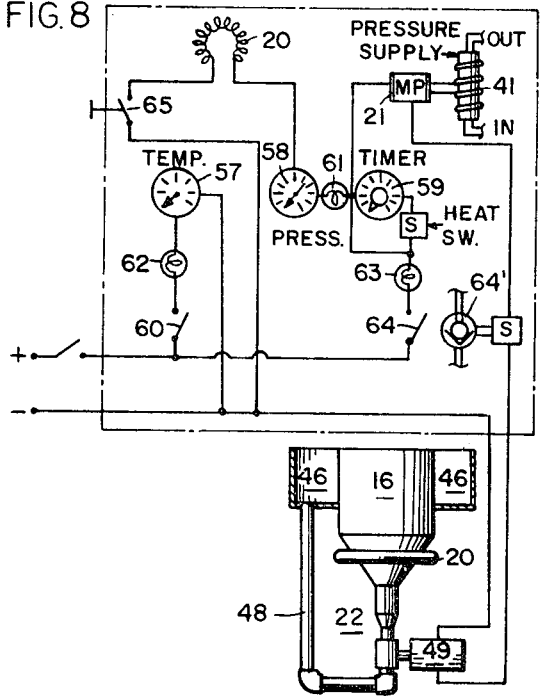

FIG. 8

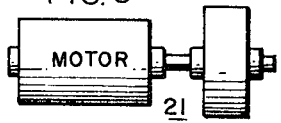

FIG. 9

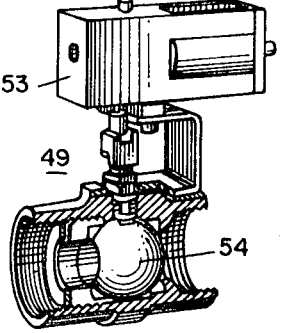

FIG. 11

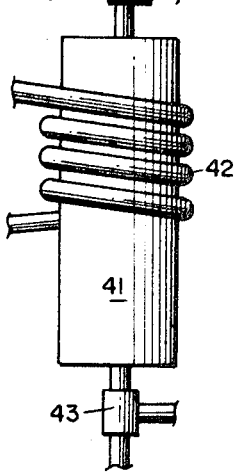

FIG. 10

INVENTOR:
CHARLES JERE ALBRIGHT
BY
Edwin Phelps
ATT'Y

APPARATUS FOR PRESSURIZED COOKING OF FOODS IN HIGH-TEMPERATURE NON-AQUEOUS LIQUIDS

It is a well-known fact that the frying and/or baking of food—especially meat—requires a considerable period of time. During that time the natural juices, inherent in the food, are subjected to the high temperatures required for cooking the food. This converts these food juices into steam which escapes into the ambient atmosphere. Such extraction of the juices lessens the taste appeal and the nutrient quality of the food.

A greatly lessened time period for cooking food, especially meat, in pressurized, high-temperature, non-aqueous liquids has been the subject matter of a number of patents in recent years. Examples of such apparatus are shown in the U.S. Pat. Nos. 2,778,736; 2,827,379; 2,917,200; 2,918,861; 2,938,648; 2,964,215; and 3,232,267. Some of these have been in commercial use.

Such types of apparatus are used with the cooking chamber operating at temperatures ranging from 325° to 380° F., with pressures ranging from 14 to 35 psi, for cooking periods ranging from 6 to 12 minutes. The general optimum for these conditions are 35 psi at temperatures approximately 380°. The time periods have to be determined by the size and nature of the food product being processed, and the desired resulting cooked condition of the foods.

In such apparatus, at the close of each cooking cycle, the cooking chamber has to have the pressure reduced to nearly normal ambient atmospheric conditions. This is imperative before opening the chamber for the removal of the food. Any attempt to obtain access to the chamber, before such reduction to pressure, very possibly could result in serious harm to the operator and/or the spraying of particles of hot liquid over the adjacent surfaces.

The disclosures of the above-noted patents inhere faults that have been characteristic of the food-cooking procedures antecedent to the appearance of these disclosures.

The most serious of these faults is that which characterizes the above-noted cooking of foods in facilities open to ambient atmosphere. This is inevitable since these disclosures generally provide for the gradual escape of the air above the hot liquid into the ambient air to a point where it clearly would be safe for the manual removal of the chamber closure. Hence, a minute or more has to elapse before the cooked food can be removed from the hot liquid. As a consequence a considerable portion of the natural juices in the food are converted into steam. This escapes into the space above the hot liquid. Obviously, this adds, somewhat, to the pressure in the receptacle and tends to further delay the removal of the closure lid. More seriously, this delays the withdrawal of the food from the hot liquid. Thus, in these prior disclosures there, inevitably, occurs the condition which has been noted above with regard to the process of frying or baking food; namely, the loss of a portion of the natural food juices.

Another disadvantage of such apparatus, as shown and described in these patents, is that under continuous use over periods of time, the draining and filtering of the liquid has to be effected when the apparatus is not required for cooking. As a result particles released from the food tend to accumulate in the liquid during such extended cooking periods. These accumulations tend to lessen the cooking efficacy of the liquid over an extended period of time. Moreover, the overcooked particles from previously processed food tend to cling to the later cooked food. The result is a reduced appeal of the later-cooked food.

The main objects of this invention, therefore, are; to provide an improved structuring of an apparatus for cooking foods in deep, high-heated liquids under pressure; to provide an improved form and positional arrangement of a closure lid for sealing the cooking chamber and make for an instant removal thereof at the timed terminus of each cooking period; to provide an improved means for developing a controlled pressure in the cooking chamber above the hot liquid during each cooking period; to provide improved means for the nearly instant separation of the cooked food and the hot liquid incident to the terminus of each timed cooking period; to provide improved means for filtering the hot liquid during each separation of the cooked food and the hot liquid; to provide improved time-controlled means for effecting the nearly instant reduction of pressure in the cooking chamber at the end of each timed cooking period; and to provide an improved structuring of an apparatus of this kind of such simple form and facile use as to make highly economical the manufacturing and marketing thereof and exceedingly gratifying and profitable the use thereof by purchasers.

In the adaptation shown in the accompanying drawings;

FIG. 1 is a front perspective view of a cabinet-enclosed, food-cooking apparatus embodying the hereinbefore-stated concept; with the closure lid, for the cooking receptacle, suspended above the cabinet;

FIG. 2 is a view similar to that of FIG. 1 but showing the closure lid in its locked, in-use position over the open end of the cooking receptacle;

FIG. 3 is a cross-sectional view taken on the plane of the line 3—3 of FIG. 2, and showing the general form of the cooking receptacle in use operation;

FIG. 4 is a perspective view of a type of caddy into which the food is placed subject to its being immersed in the hot liquid for cooking;

FIG. 5 is a somewhat diagrammatic, vertical sectional view illustrating the general arrangement of the various critical parts and instruments of the apparatus;

FIG. 6 is a top plan view of what is shown in FIG. 5;

FIG. 7 is a chart indicating the general, timed sequences for cooking food—especially meat—in this improved apparatus;

FIG. 8 is a schematic view of the circuitry and the various instruments involved in the operation of this apparatus incident to its use in cooking a batch of food;

FIG. 9 is a side view of a motor-pump unit capable of use in various ways for effecting the requisite pressure in the receptacle during the cooking operation;

FIG. 10 is a diagrammatic view of a type of unit suitable for introducing pressured fluids into the cooking receptacle;

FIG. 11 is a perspective-partly-sectional view of a valve mechanism which controls the hot liquid flow from the receptacle to a container, at terminus of each timed, cooking operation; and FIGS. 12 and 13 are diagrammatic views showing two other possible adaptations for effecting the nearly instant separation of the cooked food from the hot liquid at the conclusion of each timed cooking period.

An apparatus embodying the foregoing concept comprises a cabinet 15 wherein is suspended a food-cooking receptacle 16 having a food inserting and withdrawal opening 17, a closure lid 18 for sealing the cooking chamber 19, an element 20 for heating the liquid in the receptacle 16, a motor-pump unit 21 operable for effecting and increase of pressure in the receptacle 16 during the cooking operation, a facility 22 for separating each batch of cooked food from the hot liquid before the opening of the receptacle to obtain access to the cooked food, and having an instrument panel 23 whereon are arranged the several devices for effecting the manual and automatic functioning of the apparatus.

The cabinet 15, as herein shown, involves a framework of angle-bars 25 mounting fixed side panels 26, a hinged front door 27 and a hinged top 28.

The food-cooking receptacle 16 is a fairly-heavy metal cylinder wherein the opening 17 is defined by a narrow, inwardly disposed rim 30, the full nature and use of which is set forth more fully in a chart application Ser. No. 791,728, now abandoned. As herein shown the bottom 29 of the cylindrical receptacle is frustrum shaped leading to a restricted tubular outlet 31 to the facility 22. Obviously, such a shaped and dimensioned bottom 29 is not critical. However, it does provide a ledge 32 in the receptacle 16 whereon may rest a removable, perforate tray 33 the function of which will be explained presently.

The closure lid 18 is a very significant and critical feature of this development for ensuring a facile and firm sealing of the cooking chamber 19. As hereinshown it is one of several adaptations which are illustrated, explained and claimed in the above-noted co-pending application Ser. No. 791,728, now abandoned. The significance of such a closure lid 18 is due to the fact that it is positionable in use position within the receptacle 16, below the rim 30 and held in place by the pressure in the cooking chamber 19, to seal the opening 17 during the cooking operation.

Such a closure lid 18, of course, could be used with the cooking receptacle 16 without any attachment of the closure lid 18 to the receptacle cabinet 15, as shown in FIG. 1. However, for use with the greatest possible ease, the closure lid is shown suspended on a chord or chain 35 from an arm 36 hinged to a bracket 37 swingably anchored to the instrument panel 23. A spring 38 spans the upward ends of the arm 36 and bracket 37. This spring 38 normally elevates the closure lid 18 into a position above the cabinet 15 and permits its swinging off to one side of the opening 17 to the cooking receptacle 16. Hence, the closure lid 18 usually is in a retracted position such as does not interfere with the insertion of the food into and its removal from the cooking receptacle 16.

The heating element 20 may be either electrical or gas-fired. As shown herein, it is in the nature of a ring positioned directly around and below the bottom of the receptacle 16 (FIGS. 3 and 5). Its "on and off" functioning is co-ordinated with the use of the apparatus as controlled by the hereinafter explained fixtures on the instrument panel 23.

The motor-pump unit 21 (FIGS. 3 and 9) involves a conventional low-voltage electric motor. The form of the pump depends upon the nature of the fluid that is preferred for enhancing the pressure in the cooking chamber 19. Such a fluid may be water, steam, ambient air, compressed air, or an artificial gas, such as nitrogen.

Whatever fluid may be employed, for pressurizing the chamber 19 during each cooking process, it has to be injected into the cooking chamber 19 through an acceptable medium. An exemplary medium is illustrated in FIG. 10. As therein shown this involves a cylinder 41 with a heating coil 42, a fluid-inlet nipple 43 and a fluid-discharge nozzle 44.

The dimension of the cylinder 41 would be determined by the size of the cooking receptacle 16. The T-shaped nipple 43 permits a connection to two different types of fluid, e.g., water or gas. Obviously, each such branch of the nipple 43 would incorporate a flow-control valve. One such branch could be connected to a water supply. The other branch could be connected to a suitable source of air or gas.

The heating coil 42 could be connected to a suitable source of electricity incorporating a controlling switch. Such a coil 42 would be available for use in converting water into steam in the cylinder 41 or warming the air or gas for injection into the chamber 19.

Whatever the type of fluid, employed to increase the pressure in the cooking chamber 19, it would be injected into the cooking chamber 19 by the motor-pump unit 21 through a tube 45 (FIG. 5) leading to the receptacle cooking chamber 19.

The facility 22, for effecting the separation of the cooked food from the hot liquid incident to each timed cooking period, is one of two of the most significant features of this development of a food-cooking apparatus. This facility effects a separation of each batch of cooked food from the hot liquid before the opening of the receptacle 16 to withdraw the food. The full significance of such a facility will be explained in a latter portion of this specification. Such a facility may take any of several forms. A tentatively preferred type of such a facility is shown in FIGS. 3, 5 and 11. Another special type is diagrammatically illustrated in FIGS. 12 and 13.

This facility 22, of FIGS. 3 and 5, involves a container 46 with which is associated a filter 47, a liquid-flow conduit 48 connecting the receptacle outlet 31 to the container 46 and having a liquid-control mechanism 49 for regulating the passage of hot liquid from the receptacle 16 to the container 46 subject to its return flow through the port 50 back to the receptacle 16.

As herein shown, the container 46 is embracively positioned on the receptacle 16 an appropriate distance above the bottom of the cooking chamber 19. A layer of insulation 51 embraces the cylinder 41 to reduce as much as possible the loss of heat from the hot liquid during its brief transfer from and return to the cooking chamber 19. Obviously, the container 46 could be placed elsewhere. However, there are advantages in having the container 46 so juxtaposed to the receptacle 16 so as to avoid as little heat loss as possible from the hot liquid during this transfer.

The filter 47 is shown arranged in the container 46. It is indicated as of cylindrical form attached to the discharge end of the conduit 48. Other filter structures could be used. If there were advantages for doing so, the filter 47 could be associated with the liquid return flow to the port 50 that leads back into the receptacle 19.

As most clearly shown in FIG. 5 such a liquid-flow conduit 48 leads from the receptacle outlet 31 upwardly along the receptacle 16 and into the under side of the container 46. The flow of the hot liquid from the receptacle 16 through the conduit 48 to the container 46 is controlled by the liquid-control mechanism 49 as shown in FIG. 11. Such a mechanism is provided by the Ramcon Corporation. A motor 53 alternates the positioning of a channeled ball 54 to cut off or permit the flow of the hot liquid through the conduit 48 as determined by the time-controlled circuitry shown in FIG. 8, as hereinafter explained.

The alternate facilities 22, shown in FIGS. 12 and 13, each involve a disk 55 reciprocably mounted in a receptacle 16. A connecting rod 56 extends outwardly of the receptacle 16 for connection to an actuating motor unit (not shown). In the instance of FIG. 12 the disk 55 is in the nature of a piston and the food is supported on apertured tray 33 during the cooking period. In the instance of FIG. 13 the food is supported on the disk 55. As will be explained later, the hereinafter-described timer will effect the operation of a motor unit to lower or raise the respective disks to separate the cooked food from the hot liquid.

The instrument panel 23 extends upwardly above the cabinet 15 along the rear thereof. Here are mounted all but one of the several instruments which control the operation of the apparatus. These instruments include a temperature gage 57, a pressure indicator 58, a timer 59, switch-actuating buttons 60 and 61, coordinated with light signals 62 and 63, and a switch-actuating button 64 for temporarily holding the return of the hot liquid from the container 46 to the receptacle 16. The one instrument not on the panel 23 is the main circuit-closing switch button 65 arranged at the right front corner of the cabinet 15 (FIGS. 1 and 2).

As shown in FIGS. 3, 4, 12 and 13, the food to be cooked is placed in a kind of caddy 66 for immersing the food in the hot liquid in the receptacle 16. As most clearly shown in FIG. 4 this caddy 66 is formed with a wire mesh cylinder 67 secured to a pair of axially spaced stable rings 68, with a bail 69 hinged to the upper of these rings. When this caddy 66 is withdrawn from the receptacle 16 it is desirable to permit any remnant of the hot liquid, that might possibly be adhering to any of the pieces of food, to be drained back into the receptacle 16. For such purposes, when needed, an L-shaped rod 70 with a hooked end 71 (FIG. 1) is swivelled on the upper rim of the instrument panel 23 for swinging into and out of position over the opening 17, when the caddy 66 is first withdrawn from the receptacle 16.

The operation of the herein-described apparatus may depend somewhat on the demands for the type of food product to be cooked therein. In general, however, the procedure would be more or less as indicated in the chart shown in FIG. 7.

Assuming that the appropriate cooking liquid, in the proper type and quantity, has been placed in the receptacle 16 the conventional power switch (FIG. 8) would be closed, as also the cabinet switch 65 (FIGS. 1 and 2). As soon as the liquid has been heated to the desired temperature—indicated by the temperature gage 57—the apparatus is ready for use.

A caddy 66 is lowered into the hot liquid in the cooking chamber 19. The food may be arranged previously in the caddy or subsequently therein. The closure lid 18 is set in place to seal off the opening 17.

The food thus becomes immersed instantly in this high temperature liquid . . . 325° to 380° F. Therefore, it is pertinent to note here that the food placed in the caddy—especially meats taken from the regrigerator—have some moisture on and directly inward of the surface. Thus the sudden immersion of the food into the hot liquid results in the conversion of that moisture into a bit of steam, rising above the hot liquid. On occasion such production of steam in the receptacle would be sufficient to complete the desired pressurized cooking of the food. On occasion when such is not the case, the closing of a switch to the herein-before-described motor-pump unit 21 will provide requisite pressure conditions in the receptacle 16.

The timer 59 then is set for the required cooking period. This latter will depend upon the quantity of food placed in the caddy 66. Thereupon the cooking proceeds.

At the instant the timer 59 cuts off the current there is an immediate separation of the cooked food and the hot liquid.

For the adaptation shown in FIGS. 3 and 5 this separation is initiated by the concurrent actuation of the motor 53 of the liquid-control mechanism 49 (FIGS. 3 and 11). This turns the ball 54 to release the pressurized liquid in the receptacle 16 to pass down out from the receptacle 16 and up through the conduit 48 into the container 46. For the adaptations shown in FIGS. 12 and 13 this separation of the food and hot liquid is initiated by a motor actuation (not shown) for the retraction or elevation of the respective disks 55. Within a very few seconds the pressure gage 59 indicates such a reduction in pressure in the receptacle as to permit the removal of the closure lid 18. In those few seconds a very significant, and never before achieved condition of the food has been attained. *The natural water juices have been heated but the major portion of these remain in the cooked food.*

This is accounted for by the reason that during the time-controlled cooking period the pressure in the receptacle 16 elevates the boiling point of the water juices in the food. As the temperature rises gradually in the food, due to its immersion in the hot liquid during the pressurized cooking, the increased boiling point retards substantial conversion into steam of the water juices.

The maximum temperature of these food water juices is reached at the end of the cooking period. In these few final seconds of cooking the hot liquid is entirely withdrawn from the food in the caddy 66, thereby preventing the food water juices from conversion into steam as the pressure in the receptacle is released. This precludes the conversion of any substantial portion of such juices into steam during this pressurized cooking operation. Thus, within the space of a very few seconds, the closure lid 18 may be removed and the caddy 66 of cooked food may be lifted from the receptacle.

Another significant feature of this disclosure also has taken place concurrently with the withdrawal of the hot liquid from the receptacle 16. *The liquid has been filtered.* Hence, with the removal of the closure lid 18, the still-hot liquid, as clear and fresh as when it was first heated in the receptacle 16, is released to return to the receptacle for a subsequent food-cooking operation.

Obviously, sanitation factors require the receptacle 16 to be washed out frequently. With the apparatus of the hereinbefore listed patents, this has had to be done when there was no great demand for the use of the equipment. With this disclosure, such cleansing of the receptacle 16 can be achieved in 2 or 3 minutes between successive cooking periods. It requires only the pressing of the switch button 64, on the instrument panel 23. That results in holding closed the normally automatic one-way check valve 49 while an attendant quickly and thoroughly cleanses the receptacle 16 ready for a continued use.

The time chart of FIG. 7 visualizes the above-explained, small time-elements involved for, 1. the easy "make-ready" of the apparatus for use,
2. the speedy cooking of the food in the receptacle,
3. the nearly instant separation of the hot liquid from the cooked food,
4. the quick removal of the cooked food from the receptacle, and
5. the occasional facile cleansing of the receptacle during regular use of the apparatus.

Variations and modifications in the details of structure and arrangement of the parts may be resorted to within the spirit and coverage of the appended claims.

I claim:

1. An apparatus for cooking food in hot non-aqueous liquid under pressure comprising, a liquid-containing food-cooking receptacle having an opening for the insertion and removal of food, a closure lid for sealing the receptacle opening, a heating element for maintaining the requisite temperature condition of the liquid for cooking food in the receptacle, means for controlling the cooking period, means for maintaining hot liquid about the food throughout the cooking period, and other means for effecting the separation of the hot-liquid from the cooked food and lowering the liquid within the receptacle at the conclusion of each cooking period before the retraction of the closure lid to permit the removal of the cooked food from the receptacle.

2. An apparatus for cooking food as set forth in claim 1 wherein the means for effecting the separation of the cooked food and hot liquid at the conclusion of each timed cooking period withdraws the hot liquid from the receptacle lid from its receptacle-sealing position.

3. An apparatus for cooking food as set forth in claim 2, wherein there is means included for returning the liquid to the receptacle subsequent to withdrawal.

4. An apparatus for cooking food as set forth in claim 3 wherein the hot liquid is filtered during each withdrawal from and return thereof to the receptacle.

5. An apparatus for cooking food as set forth in claim 1 wherein the means for effecting the separation of the cooked food and hot liquid at the conclusion of each cooking period elevates the cooked food above the level of the hot liquid in the receptacle and remove the hot liquid from the receptacle.

6. An apparatus for cooking food as set forth in claim 1 wherein the hot liquid is filtered during each separation of the hot liquid from the cooked food at the end of each cooking period.

7. An apparatus for cooking food as set forth in claim 1 wherein a timer effects the separation of the cooked food and the hot liquid before the reduction of pressure in the receptacle.

8. An apparatus for cooking food as set forth in claim 1 wherein a timer effects the separation of the cooked food and the hot liquid concurrently with the reduction of pressure in the receptacle.

9. An apparatus for cooking food as set forth in claim 1 wherein a timer effects the separation of the cooked food and the hot liquid is effected before the removal of the closure lid.

10. An apparatus for cooking as set forth in claim 1 wherein there are means for effecting pressure in the receptacle greater than the ambient air.

11. An apparatus for cooking food as set forth in claim 10 wherein the means for effecting pressure in the receptacle injects a fluid.

12. An apparatus for cooking food as set forth in claim 10 wherein the means for effecting pressure in the receptacle injects steam.

13. An apparatus for cooking food as set forth in claim 10 wherein the means for effecting pressure in the receptacle injects air.

14. An apparatus for cooking food as set forth in claim 10 wherein the means for effecting pressure in the receptacle injects a gas.

15. An apparatus for cooking food in hot liquid under pressure comprising, a support, a liquid-containing food-cooking receptacle fixed on the support and having an opening for the insertion and removal of foods, a closure lid for sealed positioning to close the receptacle opening, a heating element for maintaining the requisite temperature condition of the liquid for cooking food in the receptacle, means for effecting a controlled pressure in the receptacle greater than the ambient atmosphere, a timer for controlling successive cooking periods, a container disposed exteriorly of the receptacle and having a port open to the receptacle above the bottom thereof, a conduit connected at one end to the receptacle below the container and at the other end to the container above the port therein, and means for controlling the transfer of hot liquid from the receptacle through the conduit to the container at the close of the time-controlled cooking period, before the retraction of the closure-lid for return of the liquid to the receptacle following to the retraction of the closure lid for access to the cooked food.

16. An apparatus as set forth in claim 15 wherein a valve mechanism is interposed in the conduit for controlled actuation by the timer to effect the flow of hot liquid from the receptacle to the container at the conclusion of each time-controlled cooking period and the sealing of the conduit against such flow of liquid during each time cooking period.

17. An apparatus as set forth in claim 16 wherein a filter is positioned for the passage of the hot liquid from the receptacle to the container and the return to the receptacle.

18. An apparatus as set forth in claim 16 wherein the container is embracively positioned on the receptacle.

19. An apparatus as set forth in claim 16 wherein a filter is positioned for the passage of the hot liquid from the receptacle and return thereto, and wherein a valve-controlled branch connects the conduit to the container to by-pass the filter.

20. An apparatus for cooking food in hot liquid under pressure comprising, a support, a liquid-containing receptacle fixed on the support, a closure lid for sealed positioning to close the receptacle opening, a heating element for maintaining the requisite temperature condition of the liquid for the cooking of food in the receptacle, means for effecting a predetermined pressure in the receptacle greater than the ambient atmosphere, a timer for controlling the duration of successive cooking periods, a container embracively positioned on the receptacle and having a port open to the receptacle above the bottom thereof, a main conduit connected at one end to the receptacle below the container and at the other end to the container above the port therein, a one-way valve interposed in the conduit to prevent a back-flow from the container, a filter in the container for the passage of the hot oil before the return of the hot liquid to the receptacle, a liquid control valve interposed in the main conduit and activated by the timer for controlling the transfer of hot liquid from the receptacle through the main conduit to the container at the close of each cooking period and subject to its return to the receptacle incident to the retraction of the closure lid for access to the cooked food, and a valve-controlled branch-conduit connecting the main conduit below the one-way valve with the container to permit the hot liquid to by-pass the filter.

21. An apparatus as set forth in claim 20 wherein the port from the container to the receptacle has a one-way valve to prevent back-flow of hot liquid from the receptacle to the container.

22. An apparatus for cooking food comprising, a pressurizable receptacle having an opening therein through which the food is inserted, closure means for closing and sealing the receptacle, supply means for supplying a hot non-aqueous liquid to the receptacle in an amount to cover the food, means to maintain the temperature of the liquid for a period of time, means to separate the liquid from the food and lower the liquid within the receptacle at the end of a time period before releasing the pressure and retraction of the closure means to permit removal of the cooked food.

23. The apparatus as set forth in claim 22, wherein the hot liquid is withdrawn from the receptacle before the closure seal means is broken.

24. The apparatus as set forth in claim 23, wherein the hot liquid is separated from the food before the pressure within the receptacle is reduced to 0 p.s.i.

25. The apparatus as set forth in claim 22, wherein the hot liquid is separated from the food concurrent with a reduction of the pressure.

26. The apparatus as set forth in claim 22, wherein there is included means to vent the pressure to atmosphere after the separation of the hot liquid from the food.

27. The apparatus as set forth in claim 22, wherein there is included means to separate the hot liquid and the pressure after their withdrawal from the receptacle.

28. The apparatus as set forth in claim 22, wherein means are included to return the hot liquid to the cooking receptacle.

29. An apparatus for cooking food comprising, a pressurizable receptacle having an opening therein through which the food is inserted, closure means for closing and sealing the receptacle, supply means for supplying a hot non-aqueous liquid to the receptacle in an amount to cover the food, means to maintain the temperature of the liquid for a period of time, means to separate the liquid from the food and reduce the quantity of liquid within the receptacle at the end of a time period before releasing the pressure and retraction of the closure means to permit removal of the cooked food.

* * * * *